(12) United States Patent
 Kuehne

(10) Patent No.: US 10,537,811 B2
(45) Date of Patent: Jan. 21, 2020

(54) MOTOR VEHICLE SIMULATION SYSTEM FOR SIMULATING A VIRTUAL ENVIRONMENT WITH A VIRTUAL MOTOR VEHICLE AND METHOD FOR SIMULATING A VIRTUAL ENVIRONMENT

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/560,402

(22) PCT Filed: Feb. 19, 2016

(86) PCT No.: PCT/EP2016/000299
§ 371 (c)(1),
(2) Date: Sep. 21, 2017

(87) PCT Pub. No.: WO2016/150542
PCT Pub. Date: Sep. 29, 2016

(65) Prior Publication Data
US 2018/0250599 A1 Sep. 6, 2018

(30) Foreign Application Priority Data
Mar. 26, 2015 (DE) .................. 10 2015 003 883

(51) Int. Cl.
*G06F 3/01* (2006.01)
*G06F 3/0488* (2013.01)
(Continued)

(52) U.S. Cl.
CPC ............ *A63F 13/803* (2014.09); *G06F 3/012* (2013.01); *G06F 3/0488* (2013.01); *G06T 15/20* (2013.01); *G06T 19/003* (2013.01); *G02B 27/017* (2013.01)

(58) Field of Classification Search
None
See application file for complete search history.

(56) References Cited

U.S. PATENT DOCUMENTS

| 5,831,584 A | 11/1998 | Socks et al. |
| 2012/0113223 A1 | 5/2012 | Hilliges et al. |

(Continued)

FOREIGN PATENT DOCUMENTS

| CN | 103460256 A | 12/2013 |
| CN | 104024984 A | 9/2014 |

(Continued)

OTHER PUBLICATIONS

Purschke, F., Schulze, M., & Zimmermann, P. (Jun. 1998). Virtual reality—new methods for improving and accelerating the development process in vehicle styling and design. In Computer Graphics International, 1998. Proceedings (pp. 789-797). IEEE. (Year: 1998).*

(Continued)

*Primary Examiner* — Bijan Mapar
(74) *Attorney, Agent, or Firm* — Staas & Halsey LLP

(57) ABSTRACT

A virtual environment simulation system produces images of a virtual environment that are displayed by a head-mountable display device. A physical operating element enables a user to operate the motor vehicle simulation system which is designed to present a virtual operating element in the images of the virtual environment from a perspective emanating from a virtual site. A relative position between the display device and the physical operating element is taken into account during the image production in such a way that the virtual operating element is presented at a location in the virtual environment, the location having the same relative position in relation to the virtual site as the physical operating element in relation to the display device.

19 Claims, 2 Drawing Sheets

(51) Int. Cl.
*G06T 15/20* (2011.01)
*G06T 19/00* (2011.01)
*A63F 13/803* (2014.01)
*G02B 27/01* (2006.01)

(56) References Cited

U.S. PATENT DOCUMENTS

| | | | |
|---|---|---|---|
| 2014/0204002 A1 | 7/2014 | Bennet et al. | |
| 2014/0204079 A1* | 7/2014 | De La Riviere | G06F 3/011 345/419 |
| 2014/0364215 A1* | 12/2014 | Mikhailov | H04N 13/271 463/31 |

FOREIGN PATENT DOCUMENTS

| | | |
|---|---|---|
| DE | 297 20 443 U1 | 4/1998 |
| DE | 103 43 967 A1 | 4/2005 |
| DE | 102015003883.4 | 3/2015 |
| WO | 2014/113408 A1 | 7/2014 |
| WO | PCT/EP2016/000299 | 2/2016 |

OTHER PUBLICATIONS

Office Action dated Jul. 4, 2018, in corresponding Chinese Patent Application No. 201680016294.4, 5 pp.
International Search Report for PCT/EP2016/000299 dated May 2, 2016.
German OA for Application No. 102015003883.4 dated Jan. 22, 2016.
M. Mihelj et al.; Virtual Reality Technology and Applications, Intelligent Systems, Control and Automation; Science and Engineering 68, Chapter 9, 2014, pp. 205-206.
English Translation of International Preliminary Examination Report on Patentability for PCT/EP2016/000299 dated Sep. 28, 2017.

* cited by examiner

MOTOR VEHICLE SIMULATION SYSTEM FOR SIMULATING A VIRTUAL ENVIRONMENT WITH A VIRTUAL MOTOR VEHICLE AND METHOD FOR SIMULATING A VIRTUAL ENVIRONMENT

CROSS REFERENCE TO RELATED APPLICATIONS

This application is the U.S. national stage of International Application No. PCT/EP2016/000299, filed Feb. 19, 2016 and claims the benefit thereof. The International Application claims the benefits of German Application No. 10 2015 003 883.4 filed on Mar. 26, 2015, both applications are incorporated by reference herein in their entirety.

BACKGROUND

Described below is a system for motor vehicle simulation simulating a virtual environment with a virtual motor vehicle, wherein the system includes a virtual environment simulation system which is designed to produce images of a virtual environment with a virtual motor vehicle. Moreover, the motor vehicle simulation system includes a head-mountable display device which is designed to display the images produced by the virtual environment simulation system. Moreover, the system includes a physical operating element, by which the system is operable by a user for the purposes of configuring the virtual motor vehicle, wherein the virtual environment simulation system is furthermore designed to set a perspective emanating from a virtual site when producing images of the virtual environment, the virtual environment being presented from the perspective. Also described below is a method for simulating a virtual environment with a virtual motor vehicle by using such a motor vehicle simulation system.

The related art has disclosed the use of head-mountable display devices, such as VR goggles, AR goggles, head-mounted displays, and so on, for the purposes of simulating virtual environments. Using these, virtual environments can be presented in two dimensions or else in three dimensions and hence particularly realistically. Hence, there are no limits for creating very different virtual worlds. By way of example, such an arrangement can be used to virtually simulate various motor vehicle models for a user, for example at a retailer, and also to display various configurations of a motor vehicle model. This allows the user to examine motor vehicle models or specific configurations, even if the motor vehicle retailer does not currently have the desired model or the desired configuration in stock.

Here, it would be desirable for the user to be able to operate the controls of the motor vehicle simulation system, for example for the purposes of configuring a virtual motor vehicle, as easily as possible by a physical operating element. However, a problem arising when operating operating elements in combination with head-mountable display devices is that a user who wears a head-mountable display device and to whom a virtual environment is presented is unable to see his physical environment. Known operating elements, such as a mouse, a keyboard, a joystick, keys, buttons, touchscreens or touchpads are consequently difficult to find for a user in the virtually blind state and the elements are also difficult to operate or inoperable. In order to be able to provide an operating option with such operating elements, the user would therefore have to remove the head-mountable display device for operating purposes or, if the display device is designed to this end, alternate between the presentation of the virtual environment and the presentation of the physical environment. In both cases, this interrupts the simulation of the virtual environment and, moreover, is very cumbersome and time-consuming for a user. Although, in this case, it is also possible to resort to operating options which are able to circumvent the problem of the physical environment not being visible, such as e.g. eye tracking systems integrated into VR goggles, the aforementioned problems continue to exist for operating the motor vehicle simulation system by known, manually operable operating elements.

SUMMARY

Therefore, described below are a motor vehicle simulation system and a method for simulating a virtual environment, which provide a user with control of the motor vehicle simulation system as simply as possible, in particular by manually operable operating elements, even while a virtual environment is presented by a head-mountable display device.

Now, the motor vehicle simulation system described herein is distinguished by virtue of it being designed to present a virtual operating element in the images of the virtual environment, wherein the motor vehicle simulation system furthermore includes a first position capturing system which is designed to ascertain at least a relative physical position between the head-mountable display device and the physical operating element. Further, the virtual environment simulation system is designed to take into account the relative physical position during the image production in such a way that the virtual operating element is presented at a location in the virtual environment which has a relative virtual position in relation to the virtual site, wherein the relative virtual position between the virtual operating element and the virtual site corresponds to the relative physical position between the head-mountable display device and the physical operating element.

This configuration allows the user to see the virtual operating element that is presented in the virtual environment at the same location at which they see the physical operating element without the head-mounted display device. As it were, the physical operating element is reproduced or presented true to its location in the virtual environment. If the user reaches for the virtual operating element that is presented in the virtual environment, they automatically grasp the physical operating element. Hence, this configuration therefore renders it possible to find and operate the physical operating element in a particularly simple manner, without having to remove the head-mountable display device or otherwise interrupt the simulation of the virtual environment.

The relative position between the head-mountable display device and the physical operating element may be ascertained repeatedly, for example periodically, just like the update of the image data of the virtual environment taking into account the respectively ascertained relative position. The presented perspective consequently changes in a manner corresponding to a head movement of the user, who wears the head-mountable display device, wherein the presented virtual operating element has the same relative position to the virtual site as the physical operating element has to the display device at all times.

In an advantageous configuration, the motor vehicle simulation system is designed, if at least one part of a hand of a user is in a predetermined capturing region of the motor vehicle simulation system, to ascertain a position of the at least one part of the hand of the user in relation to the physical operating element and take into account the ascertained position when producing the images in such a way that a virtual display element that represents the at least one part of the hand is presented in the virtual environment at the same position relative to the virtual operating element.

Hence, the current position of the user's hand is also displayed to the user in the virtual environment, in particular in relation to the virtual operating element and hence also in relation to the physical operating element, by way of the virtual display element. This also additionally contributes to simplifying the operation of the physical operating element. Additionally, the presentation of the virtual display element has a great advantage in that it is able to reduce the risk of a collision and a risk of injury to the user accompanying this since the risk of a user colliding with the physical operating element when grasping therefor is reduced as both the location of the physical operating element and the location of their hand are displayed for the user in the presentation of the virtual environment. Moreover, presenting the virtual display element reestablishes the discontinuation of the hand-eye coordination option, in turn simplifying the operation.

Moreover, displaying a display element that corresponds to the hand of the user is particularly advantageous in combination with the configuration, in which the physical operating element has a touch-sensitive operating surface such that the physical operating element is designed to capture a user touching the operating surface, wherein, in particular, the physical operating element is embodied as a touchpad or a touchscreen. Precisely with the embodiment of the operating element as a touchscreen or a touchpad, it is particularly important for the location of their hand or a part thereof, such as e.g. a finger, to be displayed to a user since the location of touch, in particular, is important when operating a touchpad or touchscreen. Without presenting a display element that corresponds to the hand or a finger, it would not be possible to operate a touchscreen or touchpad in a targeted manner. As a result, the operating errors linked to presenting the virtual display element precisely in combination with an operating element that is embodied as a touchpad or touchscreen can be effectively avoided.

In a further advantageous configuration, the motor vehicle simulation system is configured in such a way that, when presenting the virtual operating element in the virtual environment, the virtual operating element has a geometric configuration that corresponds or is identical to the geometric configuration of the physical operating element. At least, it is desirable that when the physical operating element is embodied as a touchpad or touchscreen with a touch-sensitive operating surface, at least this touch-sensitive operating surface corresponds in terms of the geometric configuration or the dimensions thereof to the virtual operating surface that is presented in the virtual environment. This also avoids operating errors and prevents grasping past the physical operating element during operation and inadvertent collision with the latter.

In a further advantageous configuration, the motor vehicle simulation system is configured in such a way that, by actuating the physical operating element in a predetermined region of the operating surface, a function that is assigned to this predetermined region, at least until the time of the actuation, is triggered. Furthermore, the motor vehicle simulation system is configured to present a menu item that is assigned to the function on the virtual operating element in a virtual region of the virtual operating element in the virtual environment, the virtual region, in terms of its arrangement in relation to the virtual operating element, corresponding to an arrangement of the predetermined region of the physical operating element in relation to the physical operating element. This allows a virtual menu to be presented to the user, to be precise likewise in a manner true to location such that, for example, the choice of a menu item in the virtual environment leads to the user automatically grasping the correct region of the operating surface of the physical operating element and triggering the function assigned to this region. As a consequence, the virtually presented operating element is, as it were, a virtual touchscreen. Here, the physical operating element need not necessarily likewise be embodied as a touchscreen, but may also be provided as a simple touchpad, which allows a significantly more cost-effective configuration of the physical operating element.

Nevertheless, the physical operating element may be embodied as a touchscreen since this allows the motor vehicle simulation system to be operated both with and without a head-mounted display device. This also renders the operating actions of a user who is currently wearing the display device on the head comprehensible to bystanders, who are not included in the simulation. Hence, it is easier for bystanders, such as e.g. a vehicle salesperson, to assist a user with the operation, for example with the navigation through the menu structure.

As already described above, the presentation of the virtual display element that represents at least one part of the hand of the user in the virtual environment is particularly advantageous. This can now be implemented in different ways, in particular when the physical operating element is embodied as a touchpad or touchscreen. In one configuration, the physical operating element is designed to capture a touch location as a position of the at least one part of the hand of the user when the operating surface is touched, wherein the motor vehicle simulation system is designed to present the virtual operating element as a virtual touchscreen and present the ascertained position at a corresponding point of the virtual touchscreen by way of the virtual display element. Here, provision can be made, for example, for the virtual display element only to be presented in the virtual environment once the physical operating element is touched by the user. This represents a particularly simple and cost-effective configuration since the known sensor system used in touchpads or touchscreens can be used to capture the touch location on the operating surface. If the touch location is only displayed to a user in the virtual environment once the touchscreen or touchpad has already been touched, it is advantageous if the physical operating element, in particular the touchpad or touchscreen, is configured in such a way that a function is not already triggered by simply touching the operating surface, but only after a predetermined operating pressure or a predetermined operating force has been exerted, which the user exerts with at least one part of their hand on the operating surface. This advantageously renders it possible to present the touch location on the physical operating element to the user by presenting the virtual display element in the virtual environment. The user can thereupon move their finger to a desired menu item without triggering a function in the process, and the user can activate the assigned function by exerting a certain operating force only once the desired menu item has been reached.

Moreover, it is also an advantageous configuration if the capturing region of the motor vehicle simulation system represents a capturing region with predetermined dimensions in relation to the physical operating element, wherein the physical operating element includes a second position capturing system which is designed to capture the position of the at least one part of the hand of the user in relation to the physical operating element, in particular in three dimensions. Accordingly, the second position capturing system may be designed to capture the location of the hand of the user in relation to the physical operating element before the user actually touches the physical operating element. In this way, it is possible to present the virtual display element representing the position of the user's hand or finger in a manner true to its location to the user already during the approach of the physical operating element. This facilitates targeted operating actions and, in turn, reduces the risk of an inadvertent collision with the physical operating element.

However, this three-dimensional capture of the position of the at least one part of the hand of the user can be brought about not only by a corresponding position capturing system that is installed in the physical operating element but also, for example, by a position capturing system that is not part of the physical operating element but instead separated therefrom. By way of example, it is also an advantageous configuration if the capturing region of the motor vehicle simulation system represents a capturing region with predetermined dimensions in relation to the head-mountable display device, wherein the head-mountable display device includes a second position capturing system which is designed to ascertain the position of the at least one part of the hand of the user in relation to the physical operating element and/or in relation to the head-mountable display device, in particular in three dimensions. This also renders it possible to present to the user the location of the user's hand in relation to the virtual operating element by way of the virtual display element, even without this requiring the physical operating element to be touched. To this end, it is not necessary for the second position capturing system, which is arranged on the head-mountable display device, to be necessarily be designed also to capture the location of the physical operating element or to directly capture the relative position of the hand of the user in relation to the physical operating element. Since the motor vehicle simulation system already includes a first position capturing system, by which the relative position between the head-mountable display device and the physical operating element is established, it is sufficient if the second position capturing system of the head-mountable display device also only captures the position of the hand of the user in relation to the head-mountable display device. In the case of a one-to-one conversion of the positions of the physical operating element to the head-mountable display device and to the captured hand of the user in relation to the head-mountable display device in the virtual environment, a correct one-to-one conversion of the relative position between the hand of the user and the physical operating element in the virtual environment also emerges automatically. A further advantage of this configuration lies in that it is not necessary for the user to be situated in the vicinity of the physical operating element for the purposes of capturing the position of the at least one part of the hand of the user. Moreover, it is also possible to use this second position capturing system that is integrated into the head-mountable display device, for example for gesture capture and gesture control. Using this, it is possible to provide even more functionalities when operating the motor vehicle simulation system without additional outlay.

On the other hand, a second position capturing system that is separate from the head-mountable display device, for example arranged on the physical operating element, is advantageous in that this allows the weight of the head-mountable display device to be reduced, which is advantageous for the comfort of wear.

In a further advantageous configuration, the second position capturing system is designed to capture a geometric structure of the hand of the user, wherein the motor vehicle simulation system is designed to present a virtual hand with a geometric structure as a display element in the virtual environment, the geometric structure corresponding to the geometric structure that was ascertained by the second position capturing system. As a result, it is advantageously possible that the alignment of the hand and the fingers of the user in the virtual environment are also displayed to the user, facilitating a correct alignment of the hand prior to the actual operating action and consequently additionally simplifying the operation.

In a further advantageous configuration, the physical operating element is arranged at a physical holding apparatus, which, in particular, is embodied as stele and/or stand and/or pedestal, wherein the holding apparatus has a predetermined geometric embodiment, and wherein the motor vehicle simulation system is designed to present the virtual operating element in a manner appropriately arranged at a virtual holding apparatus in the virtual environment, the virtual holding apparatus having a virtual geometric embodiment that corresponds to the predetermined geometric embodiment of the physical holding apparatus. If the physical operating element is arranged at a holding apparatus, there once again is a risk of a user inadvertently colliding with the physical holding device during the operation of the physical operating element and injuring themselves. This configuration reduces the risk of injury and the risk of collision in turn since the physical holding apparatus is now likewise displayed to the user as a virtual holding apparatus, wherein, in particular, the virtually presented holding apparatus represents the physical holding apparatus in relation to the physical operating element and its arrangement relative to the user and the geometric dimensions thereof with a one-to-one correspondence.

Moreover, a method is described herein for simulating a virtual environment with a virtual motor vehicle by a motor vehicle simulation system. Here, the motor vehicle simulation system includes a virtual environment simulation system which produces images of a virtual environment, a head-mountable display device which displays the images produced by the virtual environment simulation system, and a physical operating element, by which the motor vehicle simulation system is operable by a user for the purposes of configuring the virtual motor vehicle. Furthermore, the virtual environment simulation system sets a perspective emanating from a virtual site when producing the images of the virtual environment, the virtual environment being presented from the perspective. Moreover, the motor vehicle simulation system presents a virtual operating element in the images of the virtual environment, wherein the motor vehicle simulation system also includes a position capturing system which ascertains at least a relative position between the head-mountable display device and the physical operating element, wherein the virtual environment simulation system takes into account the ascertained relative position during the image production in such a way that the virtual operating element is presented at a location in the virtual environment which has a relative position in relation to the virtual site, the relative position corresponding to the relative position between the head-mountable display device and the physical operating element.

The advantages specified in conjunction with the motor vehicle simulation system and the configurations thereof apply in an analogous manner to the method. Furthermore, the features and feature combinations specified in conjunction with the motor vehicle simulation system and the configurations thereof facilitate the development of the method.

Further advantages, features, and details emerge from the following description of preferred exemplary embodiments and on the basis of the drawing.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1A:
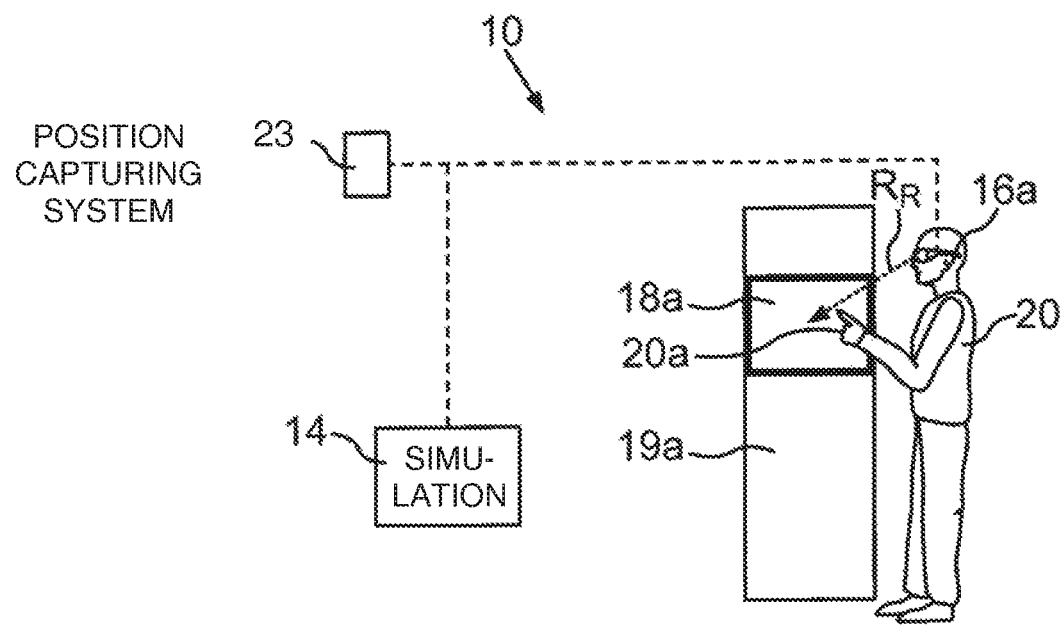
FIG. 1a is a schematic illustration of a motor vehicle simulation system for simulating a virtual environment with a virtual motor vehicle, in accordance with an exemplary embodiment.

Reference will now be made in detail to the preferred embodiments, examples of which are illustrated in the accompanying drawings, wherein like reference numerals refer to like elements throughout.

FIG. 1a shows a schematic illustration of a motor vehicle simulation system 10 for simulating a virtual environment 12 (cf. FIG. 1b) with a virtual motor vehicle 12a. To this end, the motor vehicle simulation system 10 includes a virtual environment simulation system 14 which is designed to produce images of the virtual environment 12 and a head-mountable display device 16a which is designed to display the images produced by the virtual environment simulation system 14. Here, the head-mountable display device 16a is embodied as VR goggles 16a in an exemplary manner; however, it can also be AR goggles, a VR helmet and the like.

Figure 1B:
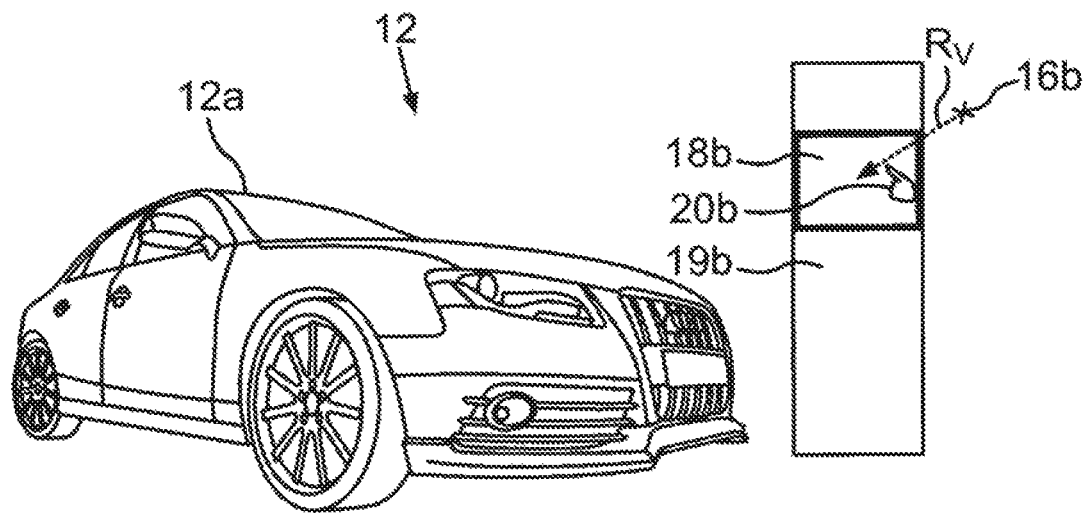
FIG. 1b is a schematic illustration of the virtual environment produced by the motor vehicle simulation system in accordance with FIG. 1a, in accordance with an exemplary embodiment.

Furthermore, the motor vehicle simulation system 10 includes a physical operating element that is embodied as a touchscreen 18a, which could alternatively be embodied as a touchpad. The physical touchscreen 18a is intended to provide the user 20 with the option of operating the motor vehicle simulation system 10 and, in particular, of configuring the virtual motor vehicle 12a as desired in the process. In order to allow the user 20 to operate the physical touchscreen 18a with the head-mounted display device 16a, the physical touchscreen 18a is presented in the virtual environment 12 in a manner true to location in relation to the user 20 as a virtual touchscreen 18b, as shown in FIG. 1b. In order to facilitate this, the virtual environment simulation system 14 initially sets a perspective emanating from a virtual site 16b, from which the virtual environment 12 is presented, during the production of the images of the virtual environment 12. Furthermore, the motor vehicle simulation system 10 includes a position capturing system 23, which is designed to ascertain a relative position $R_R$ between the VR goggles 16a and the touchscreen 18a. This ascertained relative position $R_R$ is taken into account during the image production in such a way that the virtual touchscreen 18b is presented at the location in the virtual environment 12 which has the same relative position $R_V$ from the virtual site 16b. In this way, the user 20 sees the virtual touchscreen 18b in the virtual environment 12 at the same distance and in the same direction of view, or under the same viewing angle, as they would see the physical touchscreen 18a without wearing VR goggles 16a. Thus, if the user 20 wearing VR goggles 16a reaches for the virtual touchscreen 18b that is presented in the virtual environment 12, they automatically grasp the physical touchscreen 18a. The position capturing system 23 for capturing the relative position $R_R$ between the VR goggles 16a and the touchscreen 18a can, for example, be embodied as a camera or camera system with a plurality of cameras and can, in particular, be capable of tracking the VR goggles 16a, i.e. be capable of repeatedly ascertaining and following the current position of the VR goggles 16a on a permanent basis. Since the physical touchscreen 18a is a securely installed or stationary component, the position thereof being therefore static and set, this position may be predetermined in the system, for example in relation to a predetermined coordinate system, and the position capturing system 23 captures the position of the VR goggles 16 in this coordinate system and, additionally, the relative position between the VR goggles 16a and the physical touchscreen 18a from the predetermined position of the physical touchscreen 18a.

In order now furthermore to facilitate an operation that is as exact and targeted as possible for the user and, in particular, in order to avoid inadvertent collisions with the physical touchscreen and injuries that are possibly accompanied therewith, the position of the hand 20a, or at least a part thereof, is additionally also captured by the motor vehicle simulation system 10 and presented in a corresponding fashion as a virtual hand 20b in the virtual environment 12. Here, it is particularly advantageous if it is not only the position of the hand 20a per se that is captured and presented in a corresponding manner in the virtual environment 12, but also the hand structure and the alignment thereof, i.e. the positioning of the individual fingers in relation to the palm of the hand. This is because this is advantageous in that the user 20 may already correctly align their hand 20a in the virtual environment 12 for the purposes of operating the physical touchscreen 18a before touching the physical touchscreen 18a. In order to facilitate this, provision can be made of a further position capturing system (not depicted here), such as e.g. likewise one or more cameras, in particular an infrared camera in combination with one or more infrared light sources, a time-of-flight camera, and the like. This position capturing system therefore may be designed to capture the position of the hand 20a of the user 20 in three dimensions, i.e. in all three spatial components. By way of example, this position capturing system can be arranged at the physical touchscreen 18a, or at least in the vicinity thereof, as a result of which it is particularly easily possible to capture the hand of the user 20 in relation to the physical touchscreen 18a.

Alternatively, or additionally, this position capturing system can also be arranged at the VR goggles 16a themselves, as a result of which a simple capture of the position of the hand 20a of the user 20 relative to the VR goggles 16a is possible. Both of these facilitate a presentation of a virtual hand 20b that is true to location in the virtual environment 12, and so the virtual hand 20b has the same position in relation to the virtual site 16b and in relation to the virtual touchscreen 18b as the position of the physical hand 20a in relation to the VR goggles 16a and in relation to the physical touchscreen 18a.

Furthermore, the physical touchscreen 18a may be arranged at a stele 19a. In order now also to avoid a collision with this stele 19a, walking into it and/or the like, a virtual stele 19b may have the identical position and dimensions to be also presented in the virtual environment. As a result, overall, it is possible to provide a particularly user-friendly and, in particular, also particularly safe motor vehicle simulation system 10.

Figure 2A:
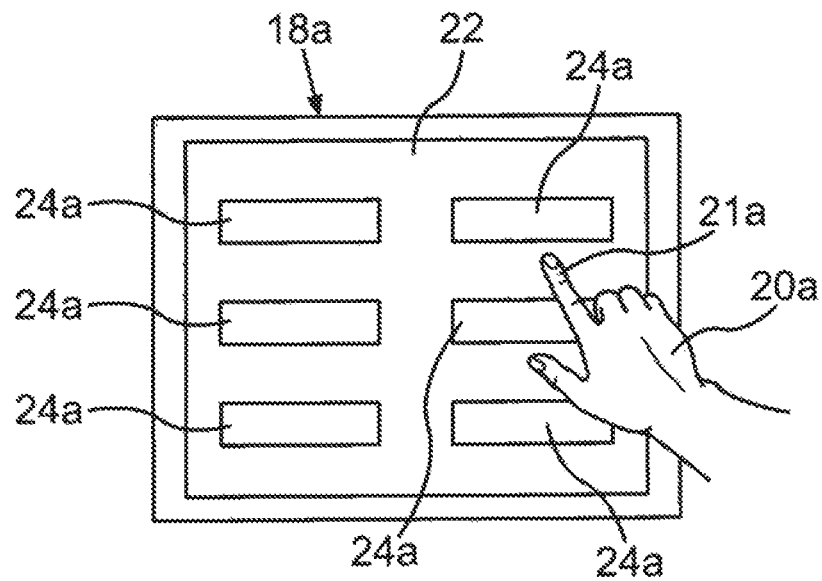
FIG. 2a is a schematic plan view of a physical operating element of a motor vehicle simulation system in accordance with an exemplary embodiment.
Figure 2B:
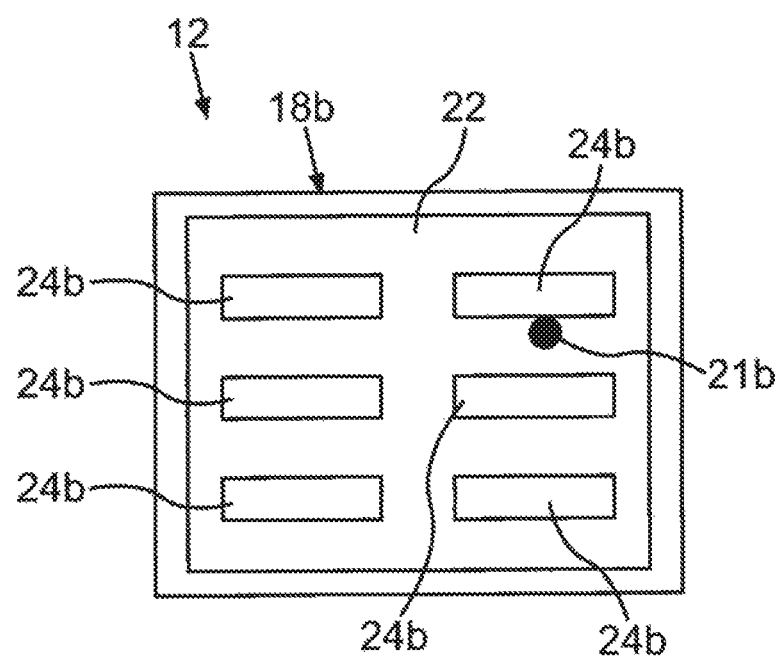
FIG. 2b is a schematic plan view of a virtual operating element that is presented in a manner corresponding to the physical operating element in accordance with FIG. 2a in the virtual environment, in accordance with an exemplary embodiment.

FIG. 2a shows a schematic illustration of the physical touchscreen 18a and FIG. 2b shows a schematic illustration of the corresponding virtual touchscreen 18b in the virtual environment 12. The physical touchscreen 18a has an operating area 22, which has a touch-sensitive embodiment and in which an operating menu can be presented. By way of example, this operating menu may have different predetermined regions 24a, each of which is assigned a respective function. Expressed differently, if the user 20 chooses one of the presented regions 24a, the function assigned to this region 24a is triggered. Here, for example, functions can be changing the virtually presented motor vehicle 12a or the configuration thereof, e.g. the choice of a specific color, the choice of a wheel rim, and so on.

In order now to be able to operate this physical touchscreen 18a even when VR goggles 16 are worn, this touchscreen is presented in an identical manner as a virtual touchscreen 18b in the virtual environment 12. Accompanying this, the virtual menu items 24 are also presented on the virtual touchscreen 18b, the virtual menu items corresponding in terms of the arrangement thereof to the real menu items 24a of the physical touchscreen 18a. In this way, the user 20 can choose the desired virtual menu items 24b in an easy and targeted manner, even if the VR goggles 16a are worn, and hence the user can choose the corresponding real menu items 24a.

Furthermore, as already described, it is also possible to present a virtual hand 20b true to location in the virtual environment 12 to the user in order to simplify the operation and reduce the risk of injury. In a particularly simple embodiment, provision can also be made for only one display element 21b, which corresponds to the hand 20a of the user 20 or else only a part of the hand 20a, such as e.g. a finger 21a, to be presented in the virtual environment 12. By way of example, the physical touchscreen 18a can be configured in such a way that the touch location is captured when the operating surface 22 is touched but a function is not triggered immediately but only after exceeding a predetermined operating force. Thus, as soon as the touch location is captured by the physical touchscreen 18a, the touch location can be displayed to the user at the identical point on the virtual touchscreen 18b in the virtual environment 12 by the virtual display element 21b, for example a point or a circle or a symbol. Hence, the user 20 can touch the physical touchscreen 18a with a low operating force and move their finger 21a to a desired menu item with the aid of the virtual display element 21b displayed thereupon and trigger the associated function by increasing the operating force.

Thus, overall, a motor vehicle simulation system is provided which allows a user to operate a touchscreen in a simple and targeted manner, even when wearing VR goggles, without having to take off the VR goggles or interrupt the simulation in the process, and which simultaneously also reduces the risk of collision with physical components and the risks of injury resulting therefrom.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A motor vehicle simulation system for simulating a virtual environment with a virtual motor vehicle, comprising:
   a virtual environment simulation system configured to set a perspective emanating from a virtual site and to produce images of the virtual environment with a virtual operating element and an exterior of the virtual motor vehicle from the perspective;
   a head-mountable display device configured to display the images produced by the virtual environment simulation system with the virtual operating element presented at a virtual location in the virtual environment at a relative virtual position in relation to the virtual site;
   a physical operating element configured to be operable by a user in configuring the virtual motor vehicle, having a touch-sensitive operating surface to detect the user touching the operating surface at a touch location as a hand position of the at least one part of a hand of the user; and
   a position capturing system configured to ascertain at least one relative physical position between the head-mountable display device and the physical operating element, corresponding to the relative virtual position between the virtual operating element and the virtual site,
   the virtual environment simulation system configured to take into account the relative physical position during production of the images so that the virtual operating element is presented to the user at the virtual location in the virtual environment as a virtual touchscreen and to present the touch location at a corresponding point of the virtual touchscreen by a virtual display element.

2. The motor vehicle simulation system as claimed in claim 1, wherein, when the at least one part of the hand of the user is in a predetermined capturing region, the position capturing system is configured to ascertain a physical hand position of the at least one part of the hand of the user in relation to the physical operating element and the virtual environment simulation system is configured to take into account the physical hand position when producing the images so that the virtual display element represents the at least one part of the hand and is presented in the virtual environment in a virtual hand position relative to the virtual operating element corresponding to the physical hand position of the at least one part of the hand relative to the physical operating element.

3. The motor vehicle simulation system as claimed in claim 2,
   wherein the predetermined capturing region has predetermined dimensions in relation to the physical operating element, and
   wherein the physical operating element includes a hand position capturing system configured to ascertain the physical hand position of the at least one part of the hand of the user in relation to the physical operating element in three dimensions.

4. The motor vehicle simulation system as claimed in claim 2,
wherein the predetermined capturing region has predetermined dimensions in relation to the head-mountable display device, and
wherein the head-mountable display device includes a hand position capturing system configured to ascertain the physical hand position of the at least one part of the hand of the user in relation to at least one of the physical operating element and the head-mountable display device in three dimensions.

5. The motor vehicle simulation system as claimed in claim 4,
wherein the hand position capturing system is configured to capture a geometric structure of the hand of the user, and
wherein the virtual environment simulation system is configured to present a virtual hand with the geometric structure as the virtual display element in the virtual environment, corresponding to the geometric structure ascertained by the hand position capturing system.

6. The motor vehicle simulation system as claimed in claim 1, wherein the physical operating element is one of a touchpad and a touchscreen.

7. The motor vehicle simulation system as claimed in claim 1, wherein the virtual environment simulation system is configured to present the virtual operating element in the virtual environment with a geometric configuration corresponding to the geometric configuration of the physical operating element.

8. The motor vehicle simulation system as claimed in claim 7, wherein the virtual environment simulation system is further configured
to trigger, in response to actuation of the physical operating element in a predetermined region of the operating surface, a function assigned to the predetermined region, at least until the actuation, and
to present a menu item assigned to the function on the virtual operating element in a virtual region of the virtual operating element in the virtual environment, the virtual region arranged on the virtual operating element corresponding to an arrangement of the predetermined region on the physical operating element.

9. The motor vehicle simulation system as claimed in claim 1,
wherein the physical operating element is arranged at a physical holding apparatus formed as at least one of a stele, a stand and a pedestal, the holding apparatus having a predetermined geometric structure, and
wherein the virtual environment simulation system is configured to present the virtual operating element arranged at a virtual holding apparatus in the virtual environment, the virtual holding apparatus having a virtual geometric structure corresponding to the predetermined geometric structure of the physical holding apparatus.

10. The motor vehicle simulation system as claimed in claim 1, wherein said head-mountable display device is further configured to display the images produced by the virtual environment simulation system with the virtual operating element outside the virtual motor vehicle at a second relative virtual position in relation to the exterior of the virtual motor vehicle.

11. A method for simulating a virtual environment with a virtual motor vehicle by a motor vehicle simulation system having a virtual environment simulation system, a head-mountable display device, and a physical operating element operable by a user, the method comprising:
setting, by the virtual environment simulation system, a perspective emanating from a virtual site;
producing, by the virtual environment simulation system, images of the virtual environment presented from the perspective, including an exterior of the virtual motor vehicle and a virtual operating element at a location in the virtual environment having a first relative virtual position in relation to the virtual site corresponding to a relative physical position between the head-mountable display device and the physical operating element;
ascertaining, by a position capturing system, the at least one relative physical position between the head-mountable display device and the physical operating element;
taking into account, by the virtual environment simulation system, the relative physical position during the image production so that the virtual operating element is presented at the location in the virtual environment;
configuring the virtual motor vehicle when a touch-sensitive operating surface of the physical operating element captures a user touching the touch-sensitive operating surface;
capturing a touch location as a hand position of at least one part of a hand of the user when the touch-sensitive operating surface is touched; and
presenting, by the virtual environment simulation system, the virtual operating element as a virtual touchscreen and the touch location at a corresponding point of the virtual touchscreen by a virtual display element.

12. The method as claimed in claim 11,
further comprising ascertaining, by the position capturing system, a physical hand position of the at least one part of the hand of the user in relation to the physical operating element when the at least one part of the hand of the user is in a predetermined capturing region, and
wherein said producing the images by the virtual environment simulation system takes into account the physical hand position so that the virtual display element represents the at least one part of the hand and is presented in the virtual environment in a virtual hand position relative to the virtual operating element corresponding to the physical hand position of the at least one part of the hand relative to the physical operating element.

13. The method as claimed in claim 12,
wherein the predetermined capturing region has predetermined dimensions in relation to the physical operating element, and
wherein the method further comprises ascertaining, by a hand position capturing system included in the physical operating element, the physical hand position of the at least one part of the hand of the user in relation to the physical operating element in three dimensions.

14. The method as claimed in claim 12,
wherein the predetermined capturing region has predetermined dimensions in relation to the head-mountable display device, and
wherein the method further comprises ascertaining, by a hand position capturing system included in the head-mountable display device, the physical hand position of the at least one part of the hand of the user in relation to at least one of the physical operating element and the head-mountable display device in three dimensions.

15. The method as claimed in claim 14,
further comprising capturing, by the hand position capturing system, a geometric structure of the hand of the user, and
wherein said presenting of the virtual touchscreen by the virtual environment simulation system includes presenting a virtual hand with the geometric structure as the virtual display element in the virtual environment, corresponding to the geometric structure ascertained by the hand position capturing system.

16. The method as claimed in claim 11, wherein said presenting by the virtual environment simulation system presents the virtual operating element in the virtual environment with a geometric configuration corresponding to the geometric configuration of the physical operating element.

17. The method as claimed in claim 11, further comprising:
triggering, in response to actuation of the physical operating element in a predetermined region of the operating surface, a function assigned to the predetermined region, at least until the actuation; and
presenting a menu item assigned to the function on the virtual operating element in a virtual region of the virtual operating element in the virtual environment, the virtual region arranged on the virtual operating element corresponding to an arrangement of the predetermined region on the physical operating element.

18. The method as claimed in claim 16, wherein the physical operating element is arranged at a physical holding apparatus formed as at least one of a stele, a stand and a pedestal, the holding apparatus having a predetermined geometric structure, and
wherein said presenting of the virtual operating element by the virtual environment simulation system arranges the virtual operating element at a virtual holding apparatus in the virtual environment, the virtual holding apparatus having a virtual geometric structure corresponding to the predetermined geometric structure of the physical holding apparatus.

19. The method as claimed in claim 11, wherein said producing, by the virtual environment simulation system, produces the images of the virtual operating element outside the virtual motor vehicle at a second relative virtual position in relation to the exterior of the virtual motor vehicle.

\* \* \* \* \*